United States Patent [19]
Saito et al.

[11] Patent Number: 6,096,843
[45] Date of Patent: *Aug. 1, 2000

[54] PROCESS FOR MAKING HIGH STEREOREGULAR POLYPROPYLENES

[75] Inventors: Jun Saito, Kimitsu; Naoshi Kawamoto, Ichihara; Akiko Kageyama, Ichikawa; Yoshiyuki Oogi, Chiba-ken; Kouichi Hatada, Ichihara, all of Japan

[73] Assignee: Chisso Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/858,498

[22] Filed: May 19, 1997

Related U.S. Application Data

[62] Division of application No. 08/767,270, Dec. 16, 1996, abandoned, which is a continuation of application No. 08/653,707, May 23, 1996, abandoned.

[30] Foreign Application Priority Data

Jun. 2, 1995 [JP] Japan .................. 7-136425

[51] Int. Cl.$^7$ ....................................... C08F 4/44
[52] U.S. Cl. .................. 526/127; 526/160; 526/351; 526/943
[58] Field of Search .................. 526/127, 160, 526/351, 943

[56] References Cited

U.S. PATENT DOCUMENTS

| | | |
|---|---|---|
| 4,874,880 | 10/1989 | Miya et al. . |
| 4,931,417 | 6/1990 | Miya et al. . |
| 4,962,262 | 10/1990 | Winter et al. . |
| 5,369,196 | 11/1994 | Matsumoto et al. ........... 526/127 |
| 5,532,396 | 7/1996 | Winter et al. ............... 556/11 |
| 5,710,223 | 1/1998 | Fukuoka et al. ............. 526/127 |
| 5,741,868 | 4/1998 | Winter et al. ............... 526/127 |
| 5,786,432 | 7/1998 | Kuber et al. ............... 526/127 |

FOREIGN PATENT DOCUMENTS

| | | |
|---|---|---|
| 2099214 | 12/1993 | Canada . |
| 0 485 822 | 5/1992 | European Pat. Off. . |
| 0 629 632 | 12/1994 | European Pat. Off. . |
| 62-104812 | 5/1987 | Japan . |
| 3-12406 | 1/1991 | Japan . |
| 3-12407 | 1/1991 | Japan . |

OTHER PUBLICATIONS

Takaya Mise, et al. "Excellent Stereoregular Isotactic Polymerizations of Propylene with $C_2$–Symmetric Silylene-–Bridged Metallocene Catalysts", Chemistry Letters, (pp. 1853–1856), 1989

A. Zambelli, et al. "Carbon–13 Observations of the Stereochemical Configuration of Polypropylene", Macromolecules, vol. 6, No. 6, (pp. 925–926), Nov.–Dec. 1973.

A. Zambelli, et al. "Model Compounds and $13_c$ NMR Observation of Stereosequences of Polypropylene", Macromolecules, vol., 8, No. 5, (pp. 687–688), Sep.–Oct. 1975.

Toshiyiki Tsutsui, et al. "Propylene Homo–and Copolymerization with Ethylene using An Ethylene using An Ethylenebis (1–Indenyl) Zirconium Dichloride and Methylaluminoxane Catalyst System", Polymer, vol. 30, (pp. 1350–1356), Jul. 1989.

Tetsuo Hayashi, et al. "Microstructure in Polypropylenes Prepared with $TiCl_4/MgCl_2$–$Et_3Al$ and $Ti(OBu)Cl_3$/$MgCl_2$–$Et_3Al$ Catalytic Systems", Polymer, vol. 30, (pp. 1714–1722), Sep. 1989.

Journal of Applied Polymer Science, vol. 52, pp. 159–172, 1993, A. Mizuno, et al., "Structural Features of Isotatic Polypropylene Obtained By Ethylenebis(1–Indenyl)Hafnium Dichloride/Methylaluminoxane Catalyst System".

*Primary Examiner*—David W. Wu
*Assistant Examiner*—Roberto Rabago
*Attorney, Agent, or Firm*—Oblon, Spivak, McClelland, Maier & Neustadt, P.C.

[57] ABSTRACT

A process for the production of a high stereoregular polypropylene wherein (a) an isotactic pentad (m m m m) is 0.950 to 0.995, (b) a syndiotactic pentad (r r r r) is 0 to 0.01, (c) a different bond due to 2,1- and 1,3-insertions of propylene monomer is 0 to 0.3 mol %, (d) an absence of a terminal double bond is confirmed, (e) a weight average molecular weight (Mw) is 50,000 to 1,000,000 and (f) a ratio (Mw/Mn) of the weight average molecular weight (Mw) to a number average molecular weight (Mn) is 1.5 to 3.8, (a) to (d) being determined from $^{13}C$ NMR spectra, comprising polymerizing propylene in the presence of hydrogen using a catalyst comprising a chiral transition metal compound and an aluminoxane, the transition metal compound being represented by the formula of $Q(C_5H_{4-m}R^1_m)(C_5H_{4-n}R^2_n)MXY$ wherein $(C_5H_{4-m}R^1_m)$ and $(C_5H_{4-n}R^2_n)$ represent a substituted cyclopentadienyl group; m and n are an integer of 1 to 3; $R^1$ and $R^2$ may be the same or different and each represents an alkyl group of 1 to 20 carbons; Q is a group capable of crosslinking $(C_5H_{4-m}R^1_m)$ and $(C_5H_{4-n}R^2_n)$ and represents a divalent, hydrocarbyl radical, an unsubstituted silylene group or a hydrocarbyl-substituted silylene group; M represents a transition metal selected from the group consisting of titanium, zirconium, and hafnium; X and Y may be the same or different and each represents a hydrogen, a halogen or a hydrocarbyl radical, and wherein said polymerization is performed by a slurry polymerization using an aliphatic hydrocarbon as a solvent or by a bulk polymerization using propylene as a solvent.

6 Claims, 1 Drawing Sheet

PROCESS FOR MAKING HIGH STEREOREGULAR POLYPROPYLENES

This is a Division of application Ser. No. 08/767,270 filed on Dec. 16, 1996, now abandoned, which is a Continuation Application of Ser. No. 08/653,707, filed May 23, 1996, abandoned.

FIELD OF THE INVENTION

This invention relates to high stereoregular polypropylenes. More specifically, the invention relates to the high stereoregular polypropylenes with narrow molecular weight distributions and high melting points, which exhibit very high tenacity, high-temperature rigidity, heat resistance and good molding properties when used as molding materials, to processes for the production of such polypropylenes and also molded products formed from such polypropylenes.

BACKGROUND OF THE INVENTION

Crystalline polypropylenes have been extensively used in the filed of various moldings, because of good mechanical properties, good chemical resistance or the like, very useful balance with economy. However, conventional known polypropylenes have limited use. Thus a strong desire has been directed to the improvement in performance of polypropylenes, especially the improvement in heat resistance characteristics such as high-temperature rigidity and high tenacity.

In recent years, it is known that propylene is polymerized using a catalyst consisiting of combinations of metallocenes with aluminoxanes to produce stereoregular polypropylenes with narrow molecular weight distributions. For instance, propylene is subjected to polymerization using a catalyst consisting of silylene-bridged metallocenes and aluminoxanes having the specific structures to produce high stereoregular polypropylenes with narrow molecular weight distributions, as disclosed in Japanese Patent Kokai 3-12406 and 3-12407 and CHEMISTRY LETTERS, PP. 1853–1856, 1989.

The polypropylenes produced by the above processes have narrow molecular weight distribution and high stereoregularity, and also higher melting point and higher rigidity than polypropylenes produced from the use of prior metallocene catalysts, but they have a double bond at one end of the polymer and may impair a chemical stability depending on the use condition, since the polymerization of propylene is performed in the absence of hydrogen. Thus the improvement of such processes has been desired with more improved heat resistance and higher tenacity.

Polypropylenes with narrow molecular weight distributions produced by known processes, due to the presence of a double bond at one end, have the problem that they are required to improve a chemical stability and a heat resistance and provide a high tenacity.

SUMMARY OF THE INVENTION

The present inventors have made extensive investigation in an effort to solve the above-mentioned problem and as a result have succeeded in producing polypropylenes with narrow molecular weight distribution and high stereoregularity having no double bond, substantially no different bond, and also have found that polypropylenes with such particular structure have exceedingly high high-temperature characteristics, high tenacity and also good molding property. Further, they have found that polypropylenes having such structure can be produced only under the specified polymerization conditions, regardless of using similar catalysts to those used in the above prior art. Such findings lead to the completion of the invention.

As apparent from the foregoing, an object of the present invention is to solve the above-mentioned problems and to provide high stereoregular polypropylenes with narrow molecular weight distributions and high melting points, which exhibit very high tenacity, high-temperature rigidity, heat resistance and good molding properties when used as molding materials.

According to the present invention, there is provided a high stereoregular polypropylene characterized in that
(a) an isotactic pentad (m m m m) is 0.950 to 0.995,
(b) a syndiotactic pentad (r r r r) is 0 to 0.01,
(c) a different bond due to 2,1- and 1,3-insertions of propylene monomer is 0 to 0.3 mol %,
(d) an absence of a terminal double bond is confirmed,
(e) a weight average molecular weight (Mw) is 50,000 to 1,000,000 and
(f) a ratio (Mw/Mn) of the weight average molecular weight (Mw) to a number average molecular weight (Mn) is 1.5 to 3.8, (a) to (d) being determined from $^{13}$C NMR spectra.

In another aspect of the present invention, there is provided a process for the production of a high stereoregular polypropylene characterized in that
(a) an isotactic pentad (m m m m) is 0.950 to 0.995,
(b) a syndiotactic pentad (r r r r) is 0 to 0.01,
(c) a different bond due to 2,1- and 1,3-insertions of propylene monomer is 0 to 0.3 mol %,
(d) an absence of a terminal double bond is confirmed,
(e) a weight average molecular weight (Mw) is 50,000 to 1,000,000 and
(f) a ratio (Mw/Mn) of the weight average molecular weight (Mw) to a number average molecular weight (Mn) is 1.5 to 3.8, (a) to (d) being determined from $^{13}$C NMR spectra, wherein propylene is polymerized in the presence of hydrogen using a catalyst comprising a chiral transition metal compound and an aluminoxane, the transition metal compound being represented by the formula of $Q(C_5H_{4-m}R^1{}_m)(C_5H_{4-n}R^2{}_n)MXY$ wherein $(C_5H_{4-m}R^1{}_m)$ and $(C_5H_{4-n}R^2{}_n)$ represent a substituted cyclopentadienyl group; m and n are an integer of 1 to 3; $R^1$ and $R^2$ may be the same or different and each represents a hydrocarbyl radical of 1 to 20 carbons, a silicone-containing hydrocarbyl radical or a hydrocarbyl radical which is joined with two carbon atoms on the cyclopentadienyl ring to form one or more hydrocarbon rings which may be substituted by a hydrocarbon; Q is a group capable of crosslinking $(C_5H_{4-m}R^1{}_m)$ and $(C_5H_{4-n}R^2{}_n)$ and represents a divalent, hydrocarbyl radical, an unsubstituted silylene group or a hydrocarbyl-substituted silylene group; M represents a transition metal selected from the group consisting of titanium, zirconium and hafnium; X and Y may be the same or different and each represents a hydrogen, a halogen or a hydrocarbyl radical.

In other aspects of the present invention, there is provided a molded product formed from a high stereoregular polypropylene characterized in that
(a) an isotactic pentad (m m m m) is 0.950 to 0.995,
(b) a syndiotactic pentad (r r r r) is 0 to 0.01,
(c) a different bond due to 2,1- and 1,3-insertions of propylene monomer is 0 to 0.3 mol %,
(d) an absence of a terminal double bond is confirmed,
(e) a weight average molecular weight (Mw) is 50,000 to 1,000,000 and
(f) a ratio (Mw/Mn) of the weight average molecular weight (Mw) to a number average molecular weight (Mn) is 1.5 to 3.8, (a) to (d) being determined from $^{13}$C NMR spectra.

DETAILED DESCRIPTION OF THE INVENTION

Figure 1:
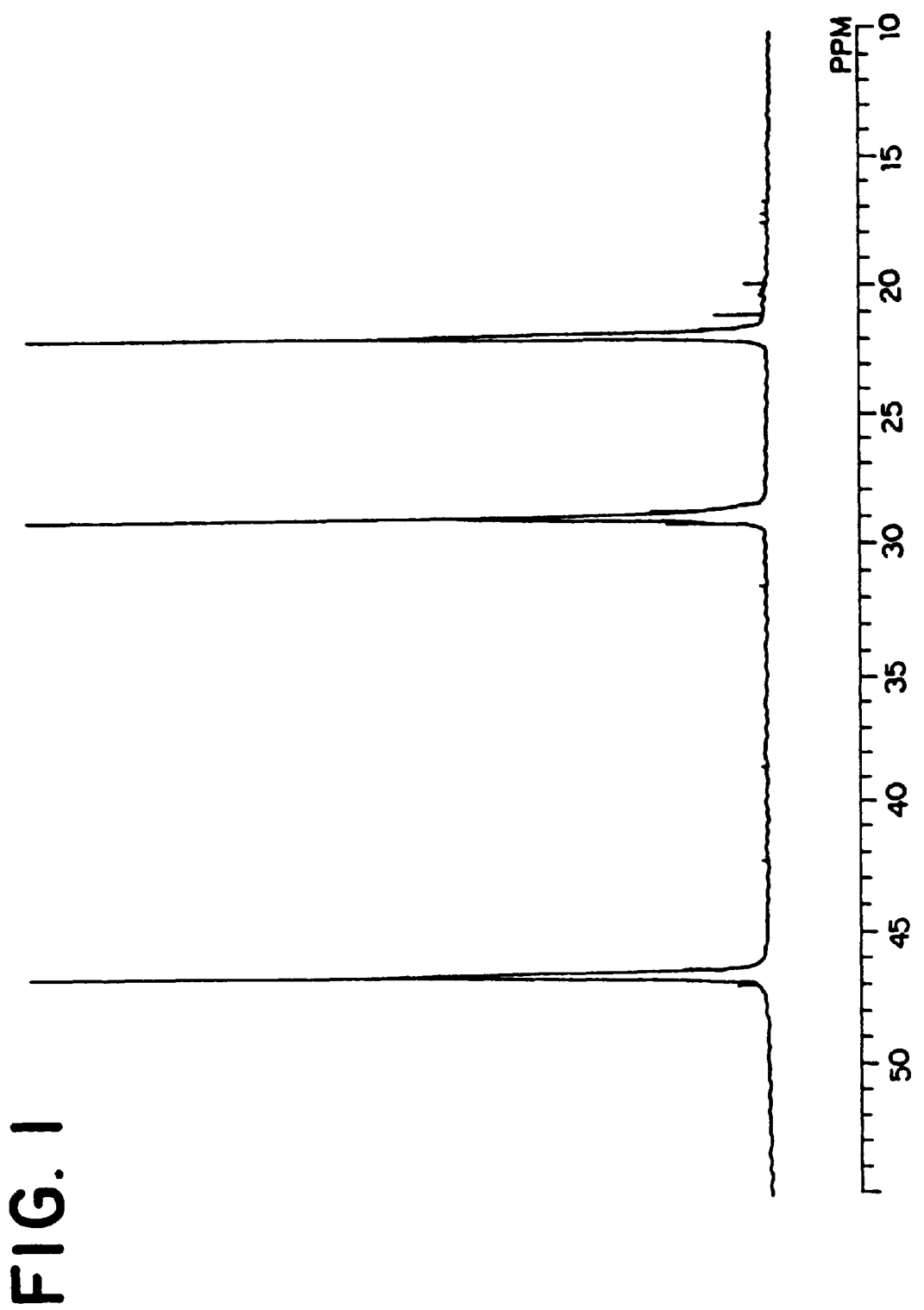
FIG. 1 shows $^{13}$C NMR spectra of the high stereoregular polypropylene of the present invention produced in Example 1.

Of the requirements for characterizing the stereoregular polypropylenes of the present invention, the above-identified (a), (b), (c) and (d) are calculated based on the results determined by $^{13}$C NMR spectra in accordance with the following method. More specifically, the NMR spectra was recorded at 130° C. on a JEOL-GX270 spectrometer manufactured by Nihon Densi K.K. in Japan operating at 67.20 MHz, using a mixed solution of o-dichlorobenzene/benzene bromide with 8/2 weight ratio having 20% by weight of polymer concentration.

The terms "isotactic pentad (m m m m)" and "syndiotactic pentad (r r r r)" as used herein refer to the isotactic sequence and the syndiotactic sequence, respectively, in terms of a pentad unit in the polypropylene molecular chain determined by $^{13}$C NMR spectra which was suggested by A. Zambelli, et al in Macromolecules Vol. 6, No. 6, 925–926, 1973.

A method of deciding the assignment of peak in the determination of $^{13}$C NMR spectra is performed in accordance with the assignment suggested by A. Zambelli, et al in Macromolecules Vol. 8, No. 5, 687–688, 1975.

The isotactic pentad (m m m m) (a) of the requirements for characterizing the stereoregular polypropylene of the present invention is the proportion of a propylene monomer unit containing 5 successive meso bonds which are present in all propylene monomer units in the polypropylene molecules. Higher isotactic (m m m m) pentad shows higher isotactic characteristics. For the polypropylenes of the present invention, the isotactic (m m m m) pentad is 0.950 to 0.995, preferably 0.955 to 0.995, especially preferably 0.960 to 0.995.

The syndiotactic pentad (r r r r) (b) of the requirements for characterizing the stereoregular polypropylene of the present invention is the proportion of a propylene monomer unit containing 5 successive racemic bonds which are present in all propylene monomer units in the polypropylene molecules. Lower syndiotactic (r r r r) pentad shows lower syndiotactic characteristics. For the polypropylenes of the present invention, the syndiotactic (r r r r) pentad is 0 to 0.01, preferably 0 to 0.007, especially preferably 0 to 0.004.

The term "different bond due to 2,1- and 1,3-insertions of propylene monomer" as used herein refers to the proportion of a different bond due to 2,1- and 1,3-insertions of propylene monomer which is present in the polypropylene molecules determined by $^{13}$C NMR spectra in accordance with the method suggested by T. Tsutsui et al in POLYMER Vol. 30, 1350–1356, 1989.

The different bond due to 2,1- and 1,3-insertions of propylene monomer (c) of the requirements for characterizing the stereoregular polypropylene of the present invention is 0 to 0.3 mol %, preferably 0 to 0.25 mol %, especially preferably 0 to 0.2 mol %. When conventional known titanium catalysts are used in the polymerization of propylene, the polymerization proceeds by the 2,1-insertion. When known metallocene catalysts are used, on the other hand, it is known that a certain degree of 2,1- and 1,3-insertions takes place and a specific amount of different bond is present in the resulting polypropylene.

From the characterization requirements (a) to (c) as listed above, it can be confirmed that the stereoregular polypropylenes of the present invention do not contain substantially chains of different bond and racemic bond and demonstrate exceedingly high isotactic characteristics consisting of much highly controlled meso bond chains.

Further, the term "terminal double bond" as used herein refers to the proportion of the double bond present at the end of polypropylene molecule determined by $^{13}$C NMR spectra in accordance with the method suggested by T. Hayashi et al in POLYMER Vol. 30, 1714–1722, 1989.

The requirement (d) for characterizing the stereoregular polypropylene of the present invention is the absence of the terminal double bond. If a double bond is present at the end of polypropylene molecules, a chemical stability of polypropylene may be impaired due to the participation of the double bond in the reaction depending on the use conditions, which will result in no occurrence of inherent characteristics of polypropylene.

Of the requirements for characterization of the present stereoregular polypropylene, (e) a weight average molecular weight (Mw) and (f) a ratio (Mw/Mn) of the weight average molecular weight (Mw) to a number average molecular weight (Mn) are calculated from the results determined by a gel permeation chromatography (GPC) in the following manner. They were measured at 135° C. using an o-dichlorobenzene solution with 0.05% by weight of a polymer concentration and a mixed polystyrene gel column, e.g. PSK gel GMH6-HT available from Toso K.K. in Japan. As a measuring device, GPC-150C manufactured by Waters Co. Ltd. is used for instance.

The requirements for characterization of the present stereoregular polypropylene, (e) a weight average molecular weight (Mw) is 50,000 to 1,000,000, preferably 100,000 to 1,000,000.

The requirements for characterization of the present stereoregular polypropylene, (f) a ratio (Mw/Mn) of the weight average molecular weight (Mw) to a number average molecular weight (Mn) is 1.5 to 3.8, preferably 1.5 to 3.5. The ratio (Mw/Mn) of the weight average molecular weight (Mw) to a number average molecular weight (Mn) is a measure of a molecular weight distribution. Larger ratio (Mw/Mn) means wider molecular weight distribution, whereas smaller ratio means narrower molecular weight distribution.

The requirements for characterization of the present stereoregualr polypropylenes are six requirements as mentioned above. A melting point of the present polypropylene shows 160 to 168° C. due to these structural feature, in particular, the above. requirements (a) to (c) and 161 to 168° C., further 162 to 168° C. depending on the structural condition.

The melting point as referred to herein is a temperature showing a peak on melting which was determined by heating polypropylene from room temperature to 230° C. at a rate of 30° C./min, keeping it at the same temperature for 10 minutes, followed by cooling down to −20° C. at a rate of −20° C./min, keeping it at the same temperature for 10 minutes and heating again it at a rate of 20° C./min, using a DSC 7 type differential scanning calorimeter manufactured by Perkin Elmer Co.

If the stereoregular polypropylene of the present invention satisfies the above-mentioned requirements for characterization, the processes for the production thereof are not limited. For instance, the process using a specified metallocene catalyst will be explained below.

The metallocene catalyst used in this process is the catalyst using metallocene as a transition metal compound and comprising combination thereof with aluminoxane.

Those which can be used as the above metallocene can include chiral transition metal compounds represented by the formula of $Q(C_5H_{4-m}R^1_m)(C_5H_{4-n}R^2_n)MXY$ wherein $(C_5H_{4-m}R^1_m)$ and $(C_5H_{4-n}R^2_n)$ represent a substituted cyclopentadienyl group; m and n are an integer of 1 to 3; $R^1$ and $R^2$ may be the same or different and each represents a hydrocarbyl radical of 1 to 20 carbons, a silicone-containing hydrocarbyl radical or a hydrocarbyl radical which is joined with two carbon atoms on the cyclopentadienyl ring to form one or more hydrocarbon ring which may be substituted by a hydrocarbon; Q is a group capable of crosslinking $(C_5H_{4-m}R^1_m)$ and $(C_5H_{4-n}R^2_n)$ and represents a divalent, hydrocarbyl radical, an unsubstituted silylene group or a hydrocarbyl-substituted silylene group; M represents a transition metal selected from the group consisting of titanium, zirconium and hafnium; X and Y may be the same or different and each represents a hydrogen, a halogen or a hydrocarbyl radical.

More preferably, the chiral transition metal compounds are used wherein $R^1$ and $R^2$ may be the same or different and each represents an alkyl group of 1 to 20 carbons, Q is a dialkyl silylene group, M represents a transition metal of zirconium or hafnium, and X and Y may be the same or different and each represents a halogen or a hydrocarbyl radical.

Examples of such metallocenes include:
Dimethylsilylene(2,4-dimethylcyclopentadienyl)(3',5'-dimethylcyclopentadienyl)titanium dichloride,
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,4-dimethylcyclopentadienyl)(3',5'-dimethylcyclopentadienyl)hafnium dimethyl,
Dimethylsilylene(2,3,5-trimethylcyclopentadienyl)(2',4',5'-trimethylcyclopentadienyl)titanium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

Of these metallocenes, especially preferred are the following compounds:
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

In the synthesis of these chiral metallocenes, a metallocene of meso form in a non-chiral structure may be formed as a by-product. In the practical use, however, all are not required to be chiral metallocenes and the meso form may be mixed. When a mixture with the meso form is used, there may be the case where atactic polypropylene polymerized from the meso form is required to remove by known process such as solvent extraction or the like so that the resulting polypropylene may meet the essential requirements of the present invention depending on the proportion of the meso form mixed and the polymerization activity of propylene.

Those chiral metallocenes can be formed in combination with aluminoxane into a catalyst, but can be supported on a finely divided carrier. The carrier is an inorganic or organic compound. The finely divided solid in a granular or spherical form having a particle diameter of 5 to 300 μm, preferably 10 to 200 μm is used.

The inorganic compounds used for the carrier include $SiO_2$, $Al_2O_3$, $MgO$, $TiO_2$, $ZnO$ or the mixtures thereof, e.g. $SiO_2$-$Al_2O_3$, $SiO_2$-$MgO$, $SiO_2$-$TiO_2$, $SiO_2$-$Al_2O_3$-$MgO$. Of these compounds, those comprising $SiO_2$ or $Al_2O_3$ as a main component are preferred.

The organic compounds used for the carrier include polymers or copolymers of α-olefins of 2–12 carbons such as ethylene, propylene, 1-butene, 4-methyl-1-pentene, and polymer or copolymer of styrene.

Aluminoxane as one of the catalyst components which can be used in combination with metallocene in the process for the production of high stereoregular polypropylenes of the present invention is an organic aluminum compound represented by the following formula (1) or (2).

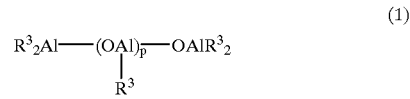

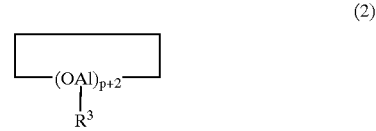

wherein $R^3$ represents a hydrocarbyl radical of 1 to 6 carbons, preferably 1 to 4 carbons, which includes an alkyl group such as methyl, ethyl, propyl, butyl, isobutyl, pentyl, hexyl; an alkenyl group such as allyl, 2-methylallyl, propenyl, isopropenyl, 2-methyl-1-propenyl, butenyl; a cycloalkyl group such as cyclopropyl, cyclobutyl, cyclopentyl, cyclohexyl; and an aryl group. Of these, the alkyl group is especially preferred and each $R^3$ may be identical or different. p is an integer of 4 to 30, preferably 6 to 30, especially preferably 8 to 30.

These aluminoxanes can be used singly or in combination of two or more. Also, they can be used in admixture with an alkyl aluminum compound such as trimethyl aluminum, triethyl aluminum, tri-isopropyl aluminum, tri-isobutyl aluminum, dimethyl aluminum chloride.

The above-mentioned aluminoxanes can be prepared under various known conditions. More specifically, the following methods can be illustrated:
(1) a method of reacting a trialkyl aluminum directly with water in the presence of an organic solvent such as toluene, ether;
(2) a method of reacting an trialkyl aluminum with salts containing water of crystallization such as copper sulfate hydrate, aluminum sulfate hydrate;
(3) a method of reacting an trialkyl aluminum with water impregnated in silica gel or the like;
(4) a method of reacting a mixture of trimethyl aluminum and tri-isobutyl aluminum directly with water in the presence of an organic solvent;

(5) a method of reacting a mixture of trimethyl aluminum and tri-isobutyl aluminum with salts containing water of crystallization such as copper sulfate hydrate, aluminum sulfate hydrate; and
(6) a method of reacting tri-isobutyl aluminum with water impregnated in silica gel, followed by reacting with trimethyl aluminum.

The catalyst which can be used in the process for the production of high stereoregular polypropylenes according to the present invention is the catalyst consisting of combination of metallocene and aluminoxane. The proportion of each catalyst component used is in such a range that an aluminum atom in aluminoxane is from 10 to 100,000 mol, preferably 50 to 50,000 mol, especially preferably 100 to 30,000 mol per mol of a transition metal atom in metallocene.

The polypropylenes of the present invention are produced by the polymerization of propylene using the thus combined catalyst in the presence of hydrogen. As a process for the polymerization of propylene can be used known polymerization processes of propylene. Those processes include a slurry polymerization wherein propylene is polymerized in an inert solvent including an aliphatic hydrocarbon such as butane, pentane, hexane, heptane, isooctane; an alicyclic hydrocarbon such as cyclopentane, cyclohexane, methylcyclohexane; an aromatic hydrocarbon such as toluene, xylene, ethylbenzene; and gasoline fraction and hydrogenated diesel oil; a bulk polymerization wherein propylene itself is used as a solvent; and a gas phase polymerization wherein propylene is polymerized in a gas phase.

As the catalyst in the polymerization of propylene, a mixture obtained by previously mixing both components of metallocene and aluminoxane in the inert solvent may be fed to a polymerization reaction system, or metallocene and aluminoxane may be separately fed to the reaction system. Prior to the polymerization of propylene, the catalyst consisting of combination of metallocene and aluminoxane may be pre-activated by the polymerization reaction of said catalyst with small amounts of α-olefins, more specifically about 1 g to about 10 kg of α-olefins per mole of the transition metal in metallocene, and subsequently the polymerization of propylene can be carried out. This procedure is effective in obtaining a final polypropylene in good particular form, which is included within the scope of the present invention.

As α-olefins which can be used in the pre-activation of the catalysts, there are preferably used those of 2 to 12 carbons which include ethylene, propylene, butene, pentene, hexene, octene, 4-methyl-1-pentene or the like. In particular, ethylene, propylene and 4-methyl-1-pentene are preferably used.

The thus prepared catalysts or the pre-activated catalysts are used in the polymerization of propylene according to the polymerization processes as mentioned above. As the polymerization conditions can be employed similar conditions to those in the polymerization of propylene according to known conventional Ziegler catalysts. More specifically, the polymerization of propylene is performed at the polymerization temperature ranging from −50 to 150° C., preferably −10 to 100° C. and the polymerization pressure ranging from an atmospheric pressure to 7 MPa, preferably 0.2 to 5 MPa in the presence of hydrogen, usually for about one minute to about 20 hours. The suitable amount of hygrogen is 0.01 kPa to 5 MPa, preferably 0.1 kPa to 3 MPa in terms of a partial pressure of hydrogen at the gas phase portion in the polymerization reactor.

After completion of the polymerization of propylene, if necessary, known after-treatments may be carried out, including deactivation of the catalyst, removal of the catalyst residue, drying of the product or the like. The high stereoregular polypropylenes of the present invention are produced through such after-treatments, but must have six requirements for characterization as listed hereinabove. If such requirements are not satisfied, the object of the present invention cannot be achieved.

Thus, the polymerization-of propylene using the above metallocene under the above-mentioned polymerization conditions cannot always produce the desired high stereoregular polypropylenes of the present invention. Depending on the kind of metallocene, choice of an optimum polymerization condition is required. For the optimum condition, relatively lower polymerization temperature is often selected from the range of the polymerization conditions as mentioned above.

High stereoregular polypropylenes of the present invention as produced in this manner have narrow molecular weight distribution and higher melting point. The present high stereoregular polypropylenes can be served as a molding compound by compounding with various additives such as antioxidants, ultraviolet absorbing agents, antistatic agents, nucleating agents, lubricants, flame retardants, antiblocking agents, colorants, inorganic or organic fillers or the like, if necessary or further with various synthetic resins to form a molding powder, or alternatively by heat melting and kneading the compounds at 190–350° C. for about 20 seconds to 30 minutes and cutting it into a particulate to form a molding pellet.

The molding can be carried out by known processes for the molding of polypropylene such as injection molding, extrusion molding, foam molding, blow molding or the like, by which there can be produced various types of moldings such as industrial injection molded parts, various containers, unstretched or stretched films, biaxially oriented films, sheets, pipes, fibers and the like.

The invention is further illustrated by the following examples. The definitions of the terms and the measuring methods which are used in the examples or comparative examples are mentioned below.

(1) Isotactic pentad (m m m m): It was determined in the above-mentioned manner.
(2) Syndiotactic pentad (r r r r): It was determined in the above-mentioned manner.
(3) Proportion of the different bond (IV): It was determined in the above-mentioned manner.
(4) Weight average molecular weight (Mw): It was determined in the above-mentioned manner.
(5) Number average molecular weight (Mn): It was determined in the above-mentioned manner.
(6) Melting point (Tm): It was determined in the above-mentioned manner.
(7) High-temprature rigidity (Unit: MPa): 100 Parts by weight of polypropylene were mixed with 0.1 part by weight of tetraxis[methylene-3-(3',5'-di-tert.-butyl-4'-hydroxyphenyl)propionate]methane and 0.1 part by weight of calcium stearate and this mixture was formed into a polypropylene pellet using a single screw extruder having a screw diameter of 40 mm and operating at an extrusion temperature of 230° C. The polypropylene pellets were molded at a resin melting temperature of 230° C. and a mold temperature of 50° C. using an injection molding machine to form a JIS type test piece. The test piece was allowed to stand in a room at a relative humidity of 50% and a room temperature of 23° C. for 72 hours and then measured for the flexural strength in accordance with JIS K7203, but using a measuring temperature of 80° C.
(8) Tenacity (Unit: MPa): Considering that a strength of the material until reaching to the breakage subsequent to the yield point in one direction tesile test of the subject specimen expresses a tenacity, the value of (a strength at break minus a strength at yield point) is defined as a measure of tenacity. More specifically, the polypropylene pellets as prepared in a similar manner as in (7) above were heat melted at 230° C. and 4.0 MPa for 3 minutes and then cooled at 30° C. and 14.8 MPa for 3 minutes using a pressing machine, and a compression molded sheet of 0.5 mm thickness was removed from a mold, from which a test specimen of 50 mm (length)×6 mm (width) was blanked. The specimen was stretched at 40° C. in a longitudinal direction at a deformation rate of 10 mm/minute using a storograph manufactured by Toyo Seiki Co. Ltd. and a strength at yield point at that time was expressed as Sy (Unit: MPa). After the necking portion of the specimen for which the strength at yield point was measured was cut with scissors, a central portion of the specimen was stretched again at 40° C. in a longitudinal direction at a deformation rate of 10 mm/minute and a strength at break of the specimen was expressed as Sb (Unit: MPa). The value of (Sb-Sy) was defined as a measure of tenacity. Higher value shows higher tenacity.

(9) Glossiness of film (%): The glossiness of film at both surfaces was measured in accordance with ASTM D523. Higher value shows higher glossiness.

(10) Young's modulus of film ($N/mm^2$): A tensile strength was measured in a machine direction (MD) and a transverse direction (TD) in accordance with ASTM D882. Higher Young's modulus shows higher rigidity.

(11) Degree of Heat shrinkage (%): A film of 100 mm×10 mm was cut in a measuring direction of the MD and TD directions, respectively. The film was heated in a bath of a silicone oil (SH-200 manufactured by Toray Silicone Co Ltd.) at 140° C. for 10 minutes and then the respective length was measured. The degree of heat shrinkage in each measuring direction was determined from the following formula:

Degree of Shrinkage =

100 × (length before heating − length after heating) / length before heating

Lower degree of shrinkage shows lower shrinkage by heating.

EXAMPLE 1

A 100 $dm^3$ stainless polymerization reactor equipped with an agitator having a tilted impeller was purged with nitrogen gas and charged at 20° C. with 50 $dm^3$ of n-hexane, 7.6 mol (in terms of Al atom) of a tolune solution of methyl aluminoxane (concentration: 2 $mol/dm^3$, available from Toso-Akzo Co. Ltd. under the trade name of MMAO) and a mixture of 1.48 mmol chiral dimethylsilylene (2,3,5-trimethylcyclopentadienyl) (2',4',5'-trimethylcyclopentadienyl)hafnium dichloride and 0.05 mmol meso dimethylsilylene (2,3,5-trimethyl cyclo pentadienyl)(2',3',5'trimethylcyclopentadienyl)hafnium dichloride together with 1 $dm^3$ of toluene. The internal temperature of the polymerization reactor was maintained at 27° C., hydrogen was supplied so that the hydrogen pressure at the gas phase portion within the polymerization reactor is 0.01 MPa and then propylene was supplied continuously to the polymerization reactor for 4 hours so that the internal pressure was maintained at 0.4 MPa, thereby carrying out the polymerization of propylene. During the polymerization, the internal temperature of the polymerization reactor was maintained at 27° C. After completion of the polymerization, unreacted propylene was discharged from the polymerization reactor, 3 $dm^3$ of 2-propanol was charged into the polymerization reactor and stirred at 30° C. for 10 minutes to carry out the deactivation of the catalyst. Subsequently, 0.2 $dm^3$ of an aqueous solution of hydrogen chloride (concentration: 12 $mol/dm^3$) and 8 $dm^3$ of methanol were added and the treatment was performed at 60° C. for 30 minutes. After the treatment, stirring was ceased to remove an aqueous phase portion from the bottom of the polymerization reactor and the same amounts of an aqueous hydrogen chloride solution and methanol were added to repeat a similar operation. 0.02 $dm^3$ of an aqueous sodium hydroxide solution (concentration: 5 $mol/dm^3$), 2 $dm^3$ of water and 2 $dm^3$ of methanol were added and stirring was continued at 30° C. for 10 minutes. After the treatment, stirring was ceased to remove an aqueous phase portion from the bottom of the polymerization reactor. 8 $dm^3$ of water was further added, stirring was continuted at 30° C. for 10 minutes and the operation to remove the aqueous phase portion was repeated twice. A polymer slurry was withdrawn from the polymerization reactor, filtered and dried to obtain 5.0 kg of the stereoregular polypropylene of the present invention.

The resultant polypropylene was determined for the physical properties, high-temperature rigidity and tenacity in the above manner. The result is shown in Table 1.

COMPARATIVE EXAMPLE 1

Polypropylene was produced in a similar manner as in Example 1, provided that the catalyst (combination of metallocene and methylaluminoxane) used in Example 1 was replaced by the catalyst comprising 3.3 mmol (in terms of Ti) of a titanium catalyst component carried on magnesium chloride which was prepared by a similar method as in Example 1 of Japanese Patent Kokai 62-104812, 100 mmol of triethyl aluminum and 10 mmol of diisopropyldimethoxysilane as a third component of the catalyst, the hydrogen pressure before initiation of the polymerization was 0.02 Mpa and the polymerization temperature was 70° C.

The resultant polypropylene was determined for the physical properties, high temperature rigidity and tenacity in a similar manner as in Example 1. The result is shown in Table 1.

COMPARATIVE EXAMPLE 2

Polypropylene was produced using the same polymerization reactor as used in Example 1 in accordance with the method mentioned in Example 4 of Japanese Patent Kokai 3-12407. More specifically, a polymerization reactor was charged at 20° C. with 50 $dm^3$ of toluene, 7.3 mol (in terms of Al atom) of a tolune solution of methylaluminoxane (concentration: 2 $mol/dm^3$, available from Toso-Akzo Co. Ltd. under the trade name of MMAO) and as metallocene a mixture of 1.42 mmol chiral dimethylsilylene (2,3,5-trimethylcyclopentadienyl) (2',4',5'-trimethylcyclopentadienyl)hafnium dichloride and 0.05 mmol meso dimethylsilylene (2,3,5-trimethyl cyclopentadienyl)(2',3',5'-trimethylcyclopentadienyl) hafnium dichloride together with 0.1 $dm^3$ of toluene. The internal temperature of the polymerization reactor was maintained at 30° C., with no introduction of hydrogen to the polymerization reactor propylene was supplied continuously to the polymerization reactor for 4 hours so that the internal pressure was maintained at 0.4 MPa, thereby carrying out the polymerization of propylene. During the polymerization, the internal temperature of the polymerization reactor was maintained at 30° C. After completion of the polymerization, unreacted propylene was discharged from the polymerization reactor and 3 $dm^3$ of methanol was charged into the polymerization reactor to decompose the catalyst. Subsequently, the filtration and drying gave polypropylene.

The resultant polypropylene was determined for the physical properties in a similar manner as in Example 1. The result is shown in Table 1.

EXAMPLE 2

A 100 dm³ stainless polymerization reactor equipped with an agitator having a tilted impeller was purged with nitrogen gas and charged at 20° C. with 11 mol (in terms of Al atom) of a tolune solution of methylaluminoxane (concentration: 2 mol/dm³, available from Toso-Akzo Co. Ltd. under the trade name of MMAO) and hydrogen so that the hydrogen pressure was maintained at 0.03 MPa, followed by introduction of 30 kg of liquefied propylene. 11 mol (in terms of Al atom) of a toluene solution of methylaluminoxane (concentration: 2 mol/dm³, available from Toso-Akzo Co. Ltd. under the trade name of MMAO) and as metallocene a mixture of 0.033 mmol chiral dimethylsilylene (2,3,5-trimethylcyclopentadienyl) (2',4',5'-trimethylcyclopentadienyl)zirconium dichloride and 0.002 mmol meso dimethylsilylene (2,3,5-trimethyl cyclo pentadienyl)(2',3',5'-trimethylcyclopentadienyl)zirconium dichloride together with 0.1 dm³ of toluene were pressurized at 20° C. under the pressure of nitrogen into the polymerization reactor, thereby initiating the polymerization of propylene. During the polymerization, the internal temperature of the polymerization reactor was maintained at 30° C. Four hours after initiation of the polymerization, 3 dm³ of 2-propanol was pressurized into the polymerization reactor, an operation to cease the polymerization was conducted at 30° C. for 5 minutes to discharge unreacted propylene from the polymerization reactor out of the system. Subsequently, 50 dm³ of n-hexane was placed into the polymerization reactor and a similar after-treatment as in Example 1 was performed to produce 6.6 kg of the stereoregular polypropylene of the present invention.

The resultant polypropylene was determined for the physical properties, high-temperature rigidity and tenacity, similarly to Example 1. The result is shown in Table 1.

EXAMPLE 3

100 parts by weight of the present polypropylene produced in a similar manner as in Example 1 were mixed with 0.1 part by weight of tetrakis[methylene-3-(3',5'-di-tert.butyl-4'-hydroxyphenyl)propionate]methane, 0.1 part by weight of calcium stearate and 0.1 part by weight of talc as a foam nucleating agent. This mixture was formed into polypropylene pellets using a single screw extruder having a screw diameter of 40 mm and operating at the extrusion temperature of 210° C. The polypropylene pellets were extruded at 250° C. using a T-die extruder having a screw diameter of 40 mm and rolled with a cooling roll at 25° C. to form a sheet of 820 μm thickness. This sheet was heated at 158° C. for 90 seconds and stretched 4.2 times in a machine direction and 8.2 times in a transverse direction at a stretching rate of 5 m/minute using a biaxial stretching machine to prepare a biaxially oriented film of 23 μm thickness.

The result of film as determined in accordance with the above-mentioned method is shown in Table 2.

COMPARATIVE EXAMPLE 3

A biaxially oriented film was prepared in a similar manner as in Example 3, provided that polypropylene produced by a similar method as in Comparative Example 1 was used in place of the present polypropylene used in Example 3. The resultant film was determined with the result shown in Table 2.

COMPARATIVE EXAMPLE 4

Polypropylene was produced by the polymerization of propylene and the after-treatment being carried out as in Example 1, provided that a mixture of 1.32 mmol of chiral, rac-ethylene bis(indenyl)hafnium dichloride and 0.15 mmol of meso-ethylene bis(indenyl)hafnium dichloride was used as metallocene and the hydrogen pressure before initiation of the polymerization was 0.04 MPa.

The resultant polypropylene was determined for the physical properties in a similar manner as in Example 1. However, evaluation of the biaxially oriented film by a similar way as in Example 3 was unsuccessful, since sheet sagged down in the sheet heating step with the result of no possibility of stretching and no formation of film.

TABLE 1

|  | Example 1 | Comparative Example 1 | Comparative Example 2 | Example 2 | Comparative Example 4 |
|---|---|---|---|---|---|
| (a) Isotactic pentad (m m m m) | 0.972 | 0.954 | 0.972 | 0.960 | 0.877 |
| Physical Properties of Polypropylene |  |  |  |  |  |
| (b) Syndiotactic pentad (r r r r) | 0.001 | 0.005 | 0.002 | 0.002 | 0.00 |
| (c) Proportion of different bond | 0.03 | Not detected | 0.06 | 0.09 | 0.66 |
| (d) Terminal double bond | Not detected | Not detected | Not detected | Not detected | Not detected |
| (e) Weight average M.W. (Mw × $10^{-4}$) | 38.3 | 39.1 | 54.3 | 28.2 | 39.0 |
| (f) Weight average M.W./Number average M.W. (Mw/Mn) | 2.4 | 5.5 | 2.4 | 2.0 | 2.3 |
| Evaluation Result |  |  |  |  |  |
| Melting point (Tm) (° C.) | 163.5 | 165.0 | 162.8 | 161.9 | 134.0 |
| High-temperature rigidity (MPa) | 14.2 | 12.7 | Not determined | 14.0 | Not determined |
| Tenacity (MPa) | 34.1 | 21.8 | Not determined | 32.1 | Not determined |

TABLE 2

| Evaluation Result of biaxially oriented film | Example 3 | Comparative Example 3 |
|---|---|---|
| Glassiness (%) |  |  |
| Cooling surface* | 124 | 112 |
| Air surface* | 120 | 105 |
| Young's modulus (N/mm²) |  |  |
| MD direction | 2150 | 1900 |
| TD direction | 5190 | 4250 |

TABLE 2-continued

| Evaluation Result of biaxially oriented film | Example 3 | Comparative Example 3 |
|---|---|---|
| Heat shrinkage (%) | | |
| MD direction | 1.0 | 2.0 |
| TD direction | 1.3 | 2.1 |

*: The cooling surface refers to one film surface in contact with a cooling roll upon the preparation of sheet prior to the formation of film, while the air surface refers to the other film surface in contact with an external air.

EFFECT OF THE INVENTION

As can be seen in the above examples, high stereoregular polypropylenes of the present invention can meet the requirements for characterization as mentioned above, thus having higher melting point and being excellent in high-temperature rigidity, other high-temperature characteristics and tenacity when used as molded products. Furthermore, the present polypropylenes can achieve an enlargement of the use limited by known polypropylenes.

What is claimed is:

1. A process for the production of a high stereoregular polypropylene wherein
   (a) an isotactic pentad (m m m m) is 0.950 to 0.995,
   (b) a syndiotactic pentad (r r r r) is 0 to 0.01,
   (c) a different bond due to 2,1- and 1,3-insertions of propylene monomer is 0 to 0.3 mol %,
   (d) an absence of a terminal double bond is confirmed,
   (e) a weight average molecular weight (Mw) is 50,000 to 1,000,000 and
   (f) a ratio (Mw/Mn) of the weight average molecular weight (Mw) to a number average molecular weight (Mn) is 1.5 to 3.8, (a) to (d) being determined from $^{13}$C NMR spectra, comprising polymerizing propylene in the presence of hydrogen using a catalyst consisting essentially of a chiral transition metal compound and an aluminoxane, the transition metal compound being represented by the formula of $Q(C_5H_{4-m}R^1_m)(C_5H_{4-n}R^2_n)MXY$ wherein $(C_5H_{4-m}R^1_m)$ and $(C_5H_{4-n}R^2_n)$ represent a substituted cyclopentadienyl group; m and n are an integer of 1 to 3; $R^1$ and $R^2$ may be the same or different and each represents an alkyl group of 1 to 20 carbons; Q is a group crosslinking $(C_5H_{4-m}R^1_m)$ and $(C_5H_{4-n}R^2_n)$ and represents a divalent, hydrocarbyl radical, an unsubstituted silylene group or a hydrocarbyl-substituted silylene group; M represents a transition metal selected from the group consisting of titanium, zirconium, and hafnium; X and Y may be the same or different and each represents a hydrogen, a halogen or a hydrocarbyl radical, and wherein said polymerization is performed by a slurry polymerization using an aliphatic hydrocarbon as a solvent or by a bulk polymerization using propylene as a solvent.

2. The process of claim 1 wherein the polymerization is carried out at a temperature of −50 to 150° C. and a pressure of atmospheric pressure to 7 MPa.

3. The process of claim 1 wherein
   (a) an isotactic pentad (m m m m) is 0.960 to 0.995,
   (b) a syndiotactic pentad (r r r r) is 0 to 0.004, and
   (c) a different bond due to 2,1- and 1,3-insertions of propylene monomer is 0 to 0.2 mol %.

4. The process of claim 1 wherein the melting point of the polypropylene is 160 to 168° C.

5. The process of claim 1 wherein the proportion of different bond is 0 to 0.09 mol %.

6. The process of claim 1 wherein the polymerization is performed by a slurry polymerization using an aliphatic hydrocarbon as a solvent.

* * * * *